US009682765B2

(12) United States Patent
Paul et al.

(10) Patent No.: US 9,682,765 B2
(45) Date of Patent: Jun. 20, 2017

(54) AIRCRAFT DOOR AND AIRCRAFT COMPRISING SUCH AN AIRCRAFT DOOR

(71) Applicant: Airbus Operations GmbH, Hamburg (DE)

(72) Inventors: Carsten Paul, Hamburg (DE); Holger Homann, Hamburg (DE)

(73) Assignee: Airbus Operations GmbH (DE)

( * ) Notice: Subject to any disclaimer, the term of this patent is extended or adjusted under 35 U.S.C. 154(b) by 31 days.

(21) Appl. No.: 14/722,267

(22) Filed: May 27, 2015

(65) Prior Publication Data
US 2015/0344122 A1    Dec. 3, 2015

(30) Foreign Application Priority Data

May 30, 2014    (DE) .......................... 10 2014 107 674

(51) Int. Cl.
*B64C 1/14*    (2006.01)
*E06B 7/22*    (2006.01)
*E06B 7/23*    (2006.01)

(52) U.S. Cl.
CPC .............. *B64C 1/1461* (2013.01); *B64C 1/14* (2013.01); *E06B 7/22* (2013.01); *E06B 7/2303* (2013.01); *E06B 7/2305* (2013.01)

(58) Field of Classification Search
CPC ..... B64C 1/1407; B64C 1/1423; B64C 1/143; E06B 7/2305
See application file for complete search history.

(56) References Cited

U.S. PATENT DOCUMENTS

| 2,560,665 | A | * | 7/1951 | Stark | B64C 1/14 49/477.1 |
| 2,686,343 | A | * | 8/1954 | Swanson | B64C 1/14 49/477.1 |
| 2,969,252 | A | * | 1/1961 | Gruver | B64C 1/14 220/378 |
| 3,085,297 | A | * | 4/1963 | Linderfelt | B64C 1/1407 244/129.5 |
| 4,312,153 | A | * | 1/1982 | Parkinson | E06B 7/231 244/129.5 |
| 4,552,326 | A | * | 11/1985 | Bokalot | B64C 1/1407 244/129.5 |

(Continued)

FOREIGN PATENT DOCUMENTS

DE   10 2008 043 023 A1    7/2010
WO      2013/042362 A1    3/2013

OTHER PUBLICATIONS

German search report (10 2014 107 674.5) dated Oct. 8, 2014.

*Primary Examiner* — Brian M O'Hara
*Assistant Examiner* — Michael Kreiner
(74) *Attorney, Agent, or Firm* — Lerner, David, Littenberg, Krumholz & Mentlik, LLP

(57) ABSTRACT

An aircraft door includes an outer shell with an exterior and an interior, a stiffening structure arranged on the interior of the outer shell, and at least one door seal arranged on the interior of the outer shell. The door seal is circumferential in an edge region. In the edge region between the outer shell and the door seal at least one circumferential stiffening component is arranged that is connected to the stiffening structure. Thus, in a particularly simple manner and without modifications to a stiffening structure, an aircraft door may be provided with very substantial stiffness in an edge region.

8 Claims, 3 Drawing Sheets

(56) References Cited

U.S. PATENT DOCUMENTS

| | | | | |
|---|---|---|---|---|
| 6,401,398 B1* | 6/2002 | Panayides | ............... | B64C 1/14 |
| | | | | 49/498.1 |
| 8,091,831 B2* | 1/2012 | Roming | ............... | B64C 1/14 |
| | | | | 244/129.4 |
| 8,511,610 B2* | 8/2013 | Depeige | ............... | B64C 1/14 |
| | | | | 244/129.4 |
| 8,740,148 B2* | 6/2014 | Risch | ............... | B64C 1/1461 |
| | | | | 244/129.5 |
| 2009/0113954 A1* | 5/2009 | De Resseguier | ......... | B64C 1/14 |
| | | | | 70/91 |
| 2014/0103163 A1* | 4/2014 | Lamat | ............... | B64C 1/143 |
| | | | | 244/129.5 |
| 2014/0345199 A1 | 11/2014 | Yahata et al. | | |

\* cited by examiner

AIRCRAFT DOOR AND AIRCRAFT COMPRISING SUCH AN AIRCRAFT DOOR

TECHNICAL FIELD

The invention relates to an aircraft door and to an aircraft comprising a fuselage with at least one door opening and with an aircraft door associated with the at least one door opening.

BACKGROUND OF THE INVENTION

Doors for closing an opening in an aircraft fuselage usually comprise a stiffened outer shell designed in such a manner that in its closed state the door forms a harmonious surface with the exterior of the fuselage. The stiffening structure covers an extensive area of an interior of the outer shell; its design is dictated by the fuselage structure and comprises longitudinal and transverse stiffening elements that are connected to the outer shell.

An edge region, which extends in close proximity to the exterior edge of an inner side of the outer shell, comprises a door seal that when the door is closed seals the aircraft cabin from the surroundings. Usually, the door seal rests directly against the outer shell and comprises a seal profile that, supported by holding profiles, is bulged. With the door in its closed state the seal profile adapts to a corresponding sealing face in or on the door opening.

In the design of aircraft components many parameters are taken into account, including, among others, the weight, stiffness, fatigue strength, ease of manufacture, and certification guidelines. Any alteration in the stiffening structure, for at least partial increase in the stiffness of the aircraft door, would necessitate renewed certification with its associated relatively high costs.

BRIEF SUMMARY OF THE INVENTION

An aspect of the invention proposes an aircraft door that comprises improved stiffness while nevertheless being as economical as possible to manufacture and if at all possible does not require a redesign of the stiffening structure.

Proposed is an aircraft door comprising an outer shell with an exterior and an interior, a stiffening structure arranged on the interior of the outer shell, and at least one door seal arranged on the interior of the outer shell, which door seal is circumferential in an edge region. In the edge region between the outer shell and the door seal at least one circumferential stiffening component is arranged that is connected to the stiffening structure.

The aircraft door thus comprises a basic design that corresponds to that of conventional aircraft doors. In the closed state of the door, the surrounding exterior of the outer shell forms a uniform surface with the outer shell of the fuselage structure. On the interior a stiffening structure is arranged that may consist of longitudinal and transverse stiffening elements.

On the edge region on the interior of the outer shell a door seal is arranged that preferably leads around the interior along a closed line. The door seal may correspond to a conventional door seal and may be implemented as a seal profile with a preformed cross section.

The door according to an embodiment of the invention is characterized in that the door seal is not directly connected to the interior of the outer shell, but instead is arranged on a stiffening component that leads around the interior along a preferably closed line or rests against the aforesaid, wherein the stiffening component is connected to the stiffening structure. Thus the edge region is not exclusively occupied by the outer shell of the aircraft door and by the door seal, but instead is provided with an additional circumferential stiffening component that is preferably designed to cope with the loads to be expected.

The stiffening component may be made according to commonly-used design methods; it comprises in particular directional changes in a profile cross section, in order to provide the desired stiffness. Apart from single and multiple kinks, channel-shaped designs with partially curved profile cross sections, or combinations of kinked and curved profile cross sections may be considered.

With the use of the edge region, in which in prior art exclusively the door seal is arranged, the stiffening structure, which comes close to the edge region, can remain untouched. In this manner a significant increase in the stiffness of the aircraft door can be achieved.

The additional stiffening component may be manufactured from a material that corresponds to the material of the outer shell and/or of the stiffening structure. The thermal expansion behavior of the different components may consequently be matched to each other in order to prevent the occurrence of distortion or stress in the aircraft door. At the same time the use of identical materials, in particular of the stiffening structure and of the stiffening component, may simplify the connection of the stiffening component with the stiffening structure by means of established connection methods.

Preferably, the stiffening structure is manufactured from a metallic material, for example an aluminum alloy, which is normally used for metallic stiffening structures on aircraft doors. As an alternative or in addition, other metallic materials or fiber-composite materials or combinations thereof may also be used.

The possible connection methods are manifold. Apart from the riveting and screw methods usual in aircraft engineering, high-strength bonding or welding methods that are suitable for these materials may also be used. If fiber-composite materials are used, laminating a stiffening component into a stiffening structure may also suggest itself. If a combination of metallic materials and fiber-composite materials are used, laminating a metallic component into a laminate structure of a component comprising fiber-composite materials would also be suitable. A metallic stiffening component may thus be laminated into a stiffening structure made of a fiber-composite material.

It is understood that the stiffening component is not connected exclusively to the stiffening structure but also to the outer shell in order to establish a stiff or rigid connection between the outer shell, the stiffening structure and the stiffening component, and furthermore in order to precisely position and affix the door seal.

In summary, in this manner an aircraft door is provided that when compared to prior art features improved stiffness without requiring fundamental modification of a stiffening structure. Furthermore, the integration of a stiffening component according to the features presented above may even be implemented in already existing doors as a retrofit solution.

In an advantageous embodiment the circumferential stiffening component comprises an at least singly-angled profile cross section that has at least one radially outwards projecting limb that is connected to the interior of the outer shell. A limb of a profile cross section is considered to be a section that is at least in some regions straight or planar and projects from the remainder of the profile cross section. This limb that is connected to the outer shell thus carries the door seal. The connection with the stiffening structure may take place by means of another surface, which is separate from the limb, which surface may be screwed, riveted, welded or bonded to the stiffening structure. Moreover, a preferably singly-angled profile cross section may be manufactured in an extremely simple and economical manner, be it by means of a folding method in the case of metallic materials or by means of manufacturing a singly-angled laminate by laying pre-impregnated webs of fiber materials and their curing in a correspondingly simple mold so that the additional stiffening in an edge region of the aircraft door is associated with very low manufacturing costs.

In a further advantageous embodiment the stiffening structure in a region in close proximity to the edge comprises a delimiting surface that extends at an angle to the interior of the outer shell, with the stiffening component being connected to said delimiting surface. As mentioned in the introduction, the stiffening structure can comprise transverse and longitudinal stiffening elements. A component of the stiffening structure, which component faces the edge region, may provide this delimiting surface, which is essentially a stiffening structure in close proximity to the edge. For fastening the stiffening component to the stiffening structure it may be advantageous to carry this out on such a delimiting surface, which is preferably arranged at an angle to the outer shell, so that the stiffening component should comprise a corresponding connecting surface, depending on the angle between the delimiting surface of the stiffening structure and the interior of the outer shell. In a particularly simple case this is a 90° angle, which may however also be a more acute angle, at which the delimiting surface of the stiffening structure inclines away from the edge region.

It is furthermore advantageous that the circumferential stiffening component comprises an L-shaped profile cross section, wherein a first limb with a first surface is fastened to the outer shell, and the door seal is positioned on a second surface of the first limb, which second surface is situated opposite the first surface, and wherein a second limb is connected to the stiffening structure. This shows the particularly simple case in which a delimiting surface of the stiffening structure comprises a 90° angle to the outer shell, and the stiffening component provides for only a 90° angle between two limbs that are connectable both to the delimiting surface of the stiffening structure and to the outer shell.

For further simplification of the aircraft door the stiffening structure in a region in close proximity to the edge may comprise an outwards-extending profile limb that is situated on the interior of the outer shell, wherein the circumferential stiffening component comprises two limbs that are arranged parallel to each other and comprise a shoulder, wherein a first limb is fastened to the interior of the outer shell, and a second limb rests against the profile limb. The stepped shape of the stiffening component thus forms a locally thickened part of the profile limb, which furthermore is extended radially outwards into the edge region, and for the purpose of improving stiffness itself acts as a thickened part of the edge region.

In a further modification the stiffening structure in a region in close proximity to the edge may comprise an outwards-extending profile limb that rests against the interior of the outer shell, may extend completely underneath the door seal, and in so doing may form the stiffening component. Thus it may be sufficient to correspondingly modify only an outside component of the stiffening structure, without altering the basic characteristics of the component, while, however, in addition providing an elongated profile limb that comprises a thickened part of the edge region in order to increase the stiffness of said edge region. Thus there would be no need to provide separate steps in the connection between the stiffening component and the stiffening structure, and manufacture is consequently further simplified.

It is favorable if the aircraft door, furthermore, comprises an essentially flat tolerance compensation component, which is arranged between the interior of the outer shell and the stiffening component, and which is sufficiently thick to allow flush placement free from distortion or stress of the stiffening component on the interior of the outer shell. In particular in the case of separate manufacture of structural components to be connected, the integration of such a tolerance compensation component may make it possible to achieve harmonious load introduction free from distortion or stress, even if there are discontinuities in the thickness of the outer shell or of the stiffening structure.

Thus it can be advantageous for at least one of the stiffening component, a region in close proximity to the edge of the stiffening structure, and the outer shell to comprise a non-uniform thickness in a fastening region between at least two of the outer shell, the stiffening structure, and the stiffening component, which non-uniform thickness is compensated for in the fastening region by the tolerance compensation component.

In an advantageous embodiment the aircraft door may, furthermore, comprise a circumferential stiffening frame that is arranged on a side of a component, which side is arranged opposite the stiffening component or the door seal, of the stiffening structure, and is connected to the interior of the outer shell. For example, if the stiffening structure comprises several components, one of them being connected to the stiffening component, said stiffening component may additionally be supported by the stiffening frame, which then together with the stiffening component encompasses the stiffening structure. Thus a still further improved increase in stiffness is achieved.

Finally, it is advantageous if the stiffening component is riveted to at least one of the outer shell and a component of the stiffening structure. In particular if the outer shell comprises a metallic material or a material that comprises a metallic component, in this manner a particularly solid connection is achieved that is mature in terms of manufacturing technology.

Finally, the invention relates to an aircraft comprising a fuselage with at least one door opening and an aircraft door associated with the at least one door opening, as described above.

The fuselage may comprise any desired shapes and may be a single-deck or a multi-deck fuselage. The door openings may, for example, be associated with a main deck, a top deck or a cargo deck.

BRIEF DESCRIPTION OF THE DRAWINGS

Further characteristics, advantages and application options of the present invention are disclosed in the following description of the exemplary embodiments and of the figures. All the described and/or illustrated characteristics per se and in any combination form the subject of the invention, even irrespective of their composition in the individual claims or their interrelationships. Furthermore, identical or similar components in the figures have the same reference characters.

DETAILED DESCRIPTION

Figure 1:
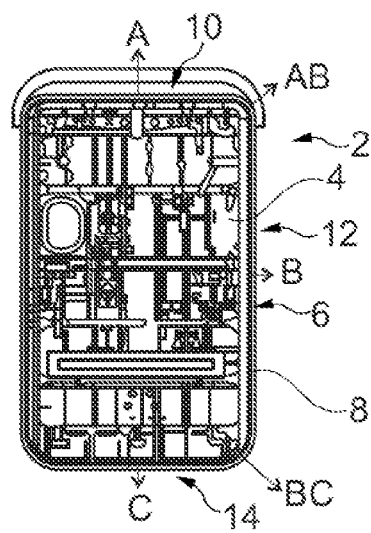
FIG. 1 shows a diagrammatic view of the interior of an aircraft door.

FIG. 1 shows a schematic view of an interior of an aircraft door 2. The door 2 comprises a stiffening structure 4 that extends over a significant part of the interior of the aircraft door 2 and ends directly in front of an edge region 6. In the edge region 6 a door seal 8 is arranged by means of which the door 2 may be sealed vis-à-vis a door opening (not shown).

The following FIGS. 2 to 6 show various embodiments for stiffening the aircraft door 2 in particular in the edge region 6, which embodiments may have a different appearance in various positions of the door 2. For this reason FIG. 1 shows designations of these different positions. At the top edge 10 an arrangement that may be used in that position is designated "A", which arrangement may correspond to the arrangement in FIGS. 2 and 5. A longitudinal edge 12 may comprise an arrangement "B" that may correspond to the arrangement of FIG. 3. Finally, on the bottom edge 14, for example, an arrangement "C" may be used that may correspond to the illustrations of FIGS. 4 and 6. The corner situated between the top edge 10 and the lateral edge 12 may comprise an arrangement "AB", which may correspond to either "A" or "B". Analogously, this also applies to the corner between the longitudinal edge 12 and the bottom edge 14, in which an arrangement "BC" may be arranged that may correspond to either "B" or "C".

However, it is pointed out that the associations "A", "B" or "C" are merely mentioned as examples and should not be interpreted as being limiting. Accordingly, it would also be possible to use an arrangement "C" or "B" on the top edge 10, etc.

Figure 2:
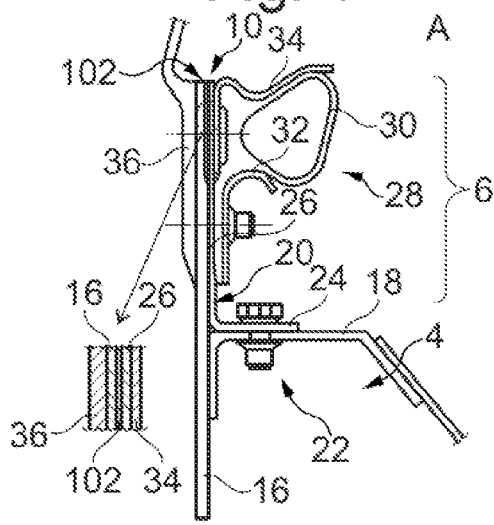
FIGS. 2 to 6 each shows an arrangement of a stiffening component in an edge region of an aircraft door.

FIG. 2 shows an arrangement "A", which is for example arranged on the top edge 10 of the door 2, as an illustration of the underlying profile cross section.

It is apparent that an outer shell 16 carries the stiffening structure 4, which comprises a component 18 that delimits the stiffening structure 4, which component 18 points to the edge region 6. According to the invention a stiffening component 20, which comprises an essentially L-shaped profile cross section, is connected by way of a threaded rivet connection 22, by way of a first limb 24 to said component 18.

On a second limb 26, which rests against the interior of the outer shell 16, a door seal 28 is arranged. Said door seal 28 comprises a circumferential seal profile 30, made from a permanently elastic rubber-like material, and comprises retaining plates 32 and 34 that support the seal profile 30 in a determined shape. For example, the stiffening component 20, together with the retaining plates 32 and 34, the seal profile 30 and a rain deflector 36, is connected to the outer shell 16.

Because of the integration of the stiffening component 20 the stiffness in the edge region 6, into which the stiffening structure 4 does not project, may be significantly improved. At the same time there is no need for any modification of the stiffening structure 4, and the components necessary to provide the additional stiffening are easy to manufacture and, furthermore, do not require re-certification of the stiffening structure 4.

Figure 3:
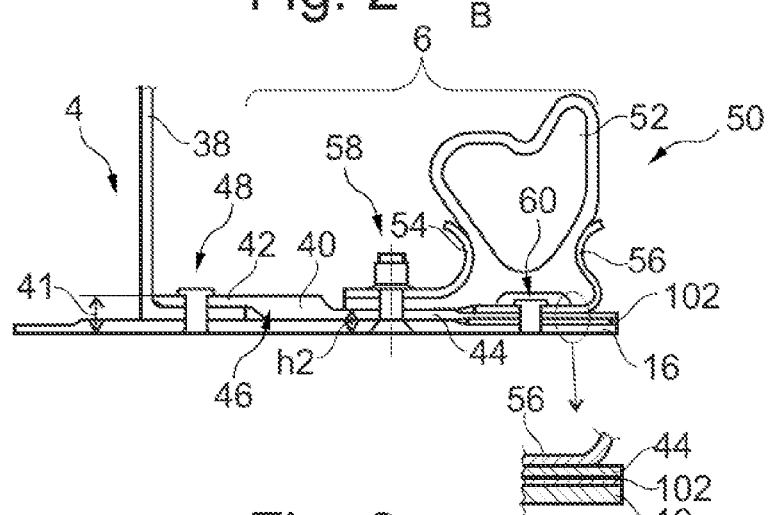

FIG. 3 shows an arrangement "B" which may, for example, be used on a longitudinal edge 12 of the door 2.

The stiffening structure 4 is closed off, by means of a component 38, towards the edge region 6, wherein the component 38 may comprise a radially outwards-directed L-profile that does not, however, project into the edge region 6. In order to additionally stiffen said edge region 6, a stiffening component 40 is provided that comprises a first limb 42 and a second limb 44, which limbs extend so as to be essentially parallel to each other and encompass a shoulder 46. The first limb 42 rests against the component 38 of the stiffening structure 4 and is connected to it, for example by way of a rivet connection 48. Towards the outside the second limb 44 extends into the edge region 6, rests against the outer shell 16 and carries a door seal 50. The aforesaid also comprises a seal profile 52 and retaining plates 54 and 56. The aforesaid are connected together with the second limb 44 and the outer shell 16, as an example in this diagram, too, a threaded rivet connection 58 and a rivet connection 60 are shown.

This additional stiffening component 40 may implement a local thickened part of the edge region 6, wherein the thickness of the stiffening component 40, as an example, tapers off towards the outside. The stiffening component 40 with the component 38 of the stiffening structure 4 first provides the greatest material thickness $h_1$, which on an interior end of the door seal 50 drops to a somewhat reduced height $h_2$, and directly underneath the seal profile 52 comprises yet another shoulder, against which the retaining plate 56 rests, thus making it possible to achieve a sufficiently stable rivet connection 60.

Figure 4:
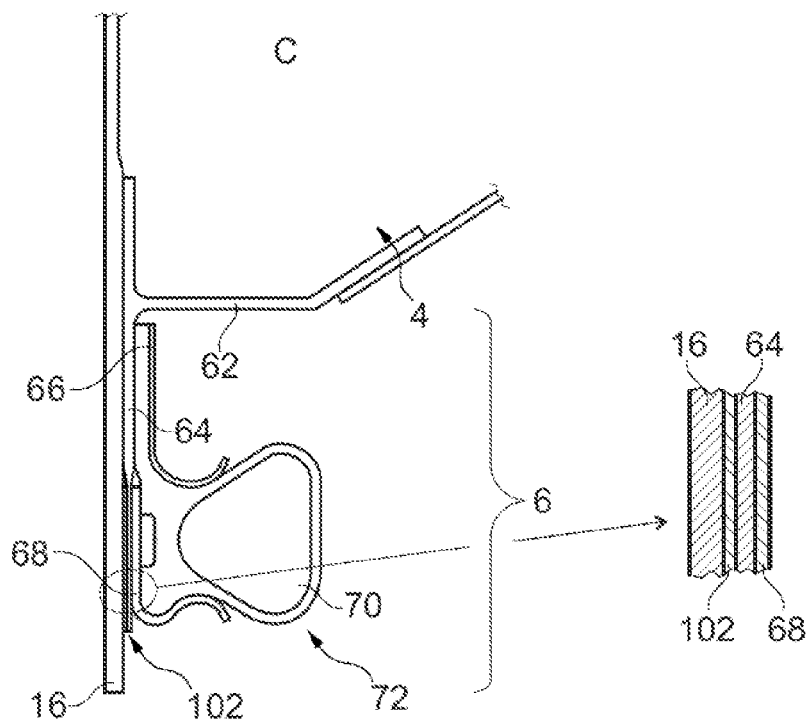

FIG. 4 shows an arrangement "C", which may, for example, be associated with the bottom edge 14 of the door 2.

In FIG. 4 the stiffening structure 4 is delimited towards the edge region 6 by means of a component 62. While it would, of course, also be possible to use the arrangement of FIG. 2, it may suggest itself to provide the component 62 that delimits the stiffening structure 4 with a profile limb 64 that extends into the edge region 6. This may, in particular, make sense if the component 62 that delimits the stiffening structure 4 extends only a short distance into the stiffening structure 4.

The profile limb 64, together with retaining plates 66 and 68 that hold a seal profile 70 of a door seal 72, is connected to the outer shell 4.

Figure 5:
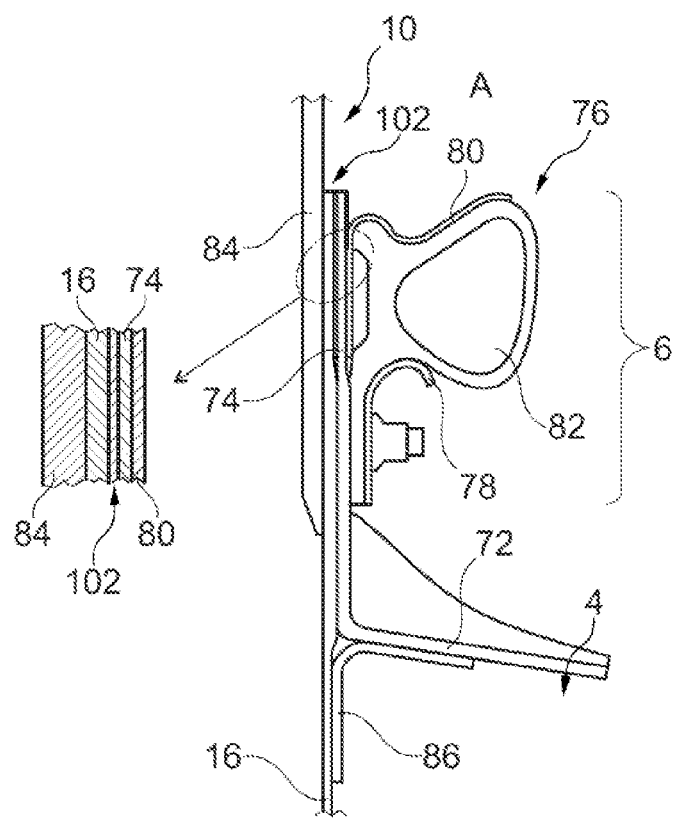

FIG. 5 shows a further arrangement "A" which may be arranged on the top 10 of the door 2. A characteristic feature of this illustration is known from FIG. 4 in a similar form. In FIG. 5 a component 72 that delimits the stiffening structure 4, instead of extending only to an area beside the edge region 6, extends fully into the edge region 6 by way of a profile limb 74 on which a door seal 76 is arranged. Said door seal 76, too, comprises retaining plates 78 and 80 that hold a seal profile 82. The retaining plates 78 and 80 are connected to the profile limb 74, the outer shell 4 and a rain deflector 84.

In addition to the aforesaid a stiffening frame 86 is provided that comprises an approximately V-shaped profile cross section with two limbs, connected by way of a radius, and that is arranged on a side of the component 72, which side faces away from the door seal 76, wherein the stiffening frame 86 delimits the stiffening structure 4 and is connected both to this component 72 and to the outer shell 4. Consequently a good increase in the stiffness in this region may be achieved, which region, in addition, with the significant extension of the profile limb 74 ensures an overall very large increase in the stiffness in the edge region 6.

Figure 6:
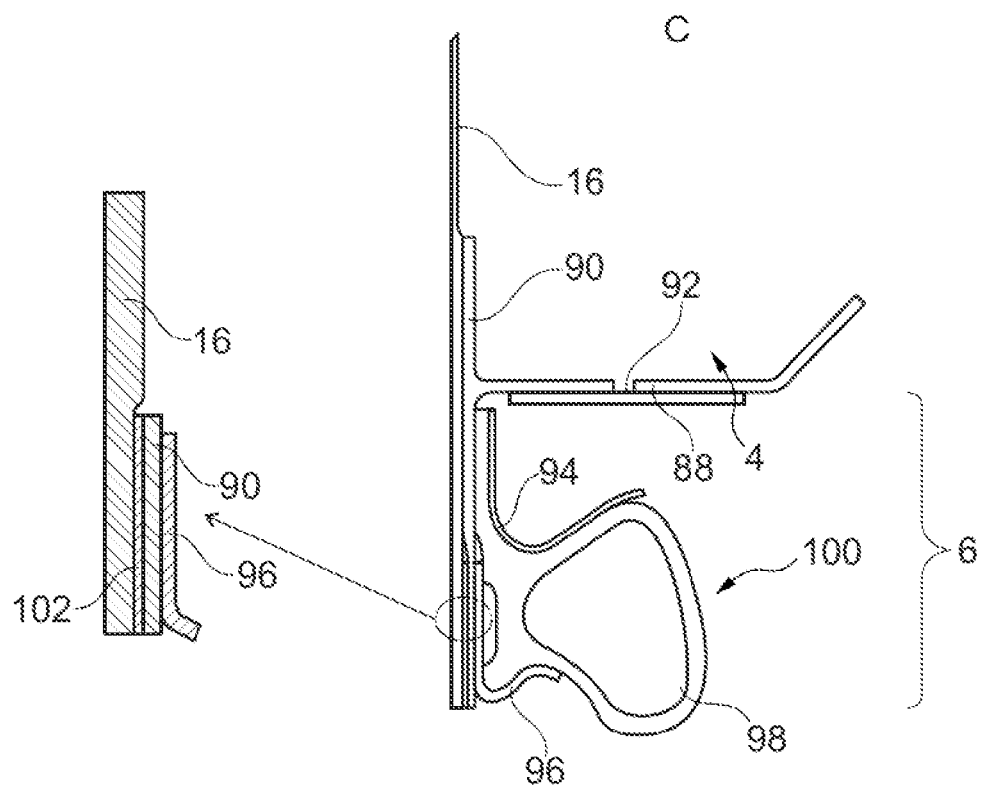

Finally, FIG. 6 shows a modification of FIG. 4. In this embodiment a component 88 that delimits the stiffening structure 4 is connected to a stiffening component 90 by way of a connecting plate 92, wherein the stiffening component 90 is a T-profile that extends both into the stiffening structure 4 and into the edge region 6. Retaining plates 94 and 96 hold the seal profile 98 of a door seal 100 and together with the stiffening component 90 are connected to the outer shell 4. This may, in particular, provide an option to subsequently additionally stiffen stiffening structures that have already been manufactured.

Moreover, in all the FIGS. 2 to 6 tolerance compensation components 102 are shown that are arranged between the stiffening components and the outer shell. In this manner different thicknesses of the outer shell, of the stiffening component, and of other components, in particular in a fastening region, may be compensated for in that fastening of the stiffening component to the outer shell is carried out so that the stiffening component may always rest flush and free from distortion and stress against the outer shell 4, and no distortion or stress arises as a result of fastening.

In addition, it should be pointed out that "comprising" does not exclude other elements or steps, and "a" or "one" does not exclude a plural number. Furthermore, it should be pointed out that characteristics which have been described with reference to one of the above exemplary embodiments can also be used in combination with other characteristics of other exemplary embodiments described above. Reference characters in the claims are not to be interpreted as limitations.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An aircraft door, comprising:
   an outer shell with an exterior and an interior;
   a stiffening structure arranged on the interior of the outer shell; and
   at least one door seal arranged on the interior of the outer shell, which door seal is circumferential in an edge region,
   wherein in the edge region between the outer shell and the door seal at least one circumferential stiffening component is arranged that is connected to the stiffening structure,
   wherein the stiffening structure in a region in close proximity to the edge comprises an outwards-extending profile limb that is situated on the interior of the outer shell, and
   wherein each circumferential stiffening component comprises two limbs that are arranged parallel to each other and comprise a shoulder, wherein a first limb is fastened to the interior of the outer shell, and a second limb rests against the profile limb of the stiffening structure.

2. The aircraft door of claim 1, wherein the circumferential stiffening component comprises an at least singly-angled profile cross section having at least one radially outwards projecting limb connected to the interior of the outer shell.

3. The aircraft door of claim 1, wherein the stiffening structure in a region in close proximity to the edge comprises a delimiting surface extending at an angle to the interior of the outer shell, with the stiffening component being connected to the delimiting surface.

4. The aircraft door of claim 1, further comprising an essentially flat tolerance compensation component arranged between the interior of the outer shell and the stiffening component, and being sufficiently thick to allow flush placement free from distortion or stress of the stiffening component on the interior of the outer shell.

5. The aircraft door of claim 4, wherein at least one of the stiffening component, a region in close proximity to the edge of the stiffening structure, and the outer shell comprises a non-uniform thickness in a fastening region between at least two of the outer shell, the stiffening structure and the stiffening component, which non-uniform thickness is compensated for in the fastening region by the tolerance compensation component.

6. The aircraft door of claim 1, further comprising a circumferential stiffening frame arranged on a side of a component, which side is arranged opposite the door seal, of the stiffening structure, and is connected to the interior of the outer shell.

7. The aircraft door of claim 1, wherein the stiffening component is riveted to at least one of the outer shell and a component of the stiffening structure.

8. An aircraft, comprising a fuselage with at least one door opening and an aircraft door associated with the at least one door opening, the aircraft door comprising:
   an outer shell with an exterior and an interior;
   a stiffening structure arranged on the interior of the outer shell; and
   at least one door seal arranged on the interior of the outer shell, which door seal is circumferential in an edge region,
   wherein in the edge region between the outer shell and the door seal at least one circumferential stiffening component is arranged that is connected to the stiffening structure,
   wherein the stiffening structure in a region in close proximity to the edge comprises an outwards-extending profile limb that is situated on the interior of the outer shell, and
   wherein each circumferential stiffening component comprises two limbs that are arranged parallel to each other and comprise a shoulder, wherein a first limb is fastened to the interior of the outer shell, and a second limb rests against the profile limb of the stiffening structure.

* * * * *